Patented Mar. 12, 1929.

1,705,034

UNITED STATES PATENT OFFICE.

WALLACE D. SMITH AND BONEITA A. SMITH, OF KALAMAZOO, MICHIGAN.

CEREAL FOOD AND PROCESS OF PREPARING.

No Drawing.  Application filed June 17, 1927.  Serial No. 199,627.

The objects of our invention are:

First, to produce an improved cereal food product from wheat which is thoroughly cooked and largely dextrinized and in good keeping condition.

Second, to produce such a food of good keeping quality.

Third, to provide an improved process of preparing the same.

Objects pertaining to details of our invention will appear from the detailed description to follow. The invention is defined in the claims.

Our improved food is prepared from wheat and cocoanut oil. In carrying out the process we have made use of an ordinary domestic steam pressure cooker which we fill about one-third full of wheat and then fill the cooker about half full of water. We then seal the cooker and heat to fifteen pounds pressure without agitation for a period of ten minutes. This apparently thoroughly sterilizes the grain and hydrolizes the starch. The grain is completely cooked but the kernels are in no way broken down. When the lid is removed and pressure is released we add cold water sufficient to supply about the amount the wheat will absorb. The wheat will absorb the water and swell to about three times its natural size.

When the wheat has been thus swelled and has absorbed the limit of water that it will take up, we place it in a centrifugal machine and remove all excess of moisture from the surface of the grain by centrifugal action. Each grain, however, is left swelled to the fullest extent that can be accomplished by this method. The centrifugal machine is only used when there is excess moisture, it being desirable not to let the grain stand.

We then heat the grain, preferably by passing steam and hot air through it, substantially to the boiling point. As soon as this is done we place the grain in a screen container (we make use of a large size corn popper), and submerge the same in hot oil at a temperature of 400 degrees Fahr. Cocoanut oil is of special advantage as it is comparatively hard and does not soften or become rancid in warm climates. Any vegetable oil will give good results. This at once completely cooks and roasts the swelled kernels of grain. As soon as the moisture is all driven off and while the grain is still hot, we place the same in a centrifugal machine and remove all excess oil. By this means the greasy condition of the kernels is entirely avoided. The grains are expanded to the limit to which they can be distended by moisture and the entire nutritive value of the grain is retained, none of it being dissipated in any way by germination. Only a negligible trifle of soluble material is thrown off by the centrifugal action. Large crisp nutty-flavored grains are produced which are of a light brown color and which will keep in condition in properly sealed packages for a considerable time. When cocoanut oil is used the food keeps in fine condition for a long time. We use a high grade cocoanut oil.

The grains are very desirable for use like salted peanuts or almonds. They are available as a breakfast food, and may be used in confectionery either whole or crushed.

Having thus described our invention, what we claim as new and desire to secure by Letters Patent is:

1. An improved cereal food consisting of grains of wheat expanded to about three times their normal bulk, and the starch thereof hydrolized and dextrinized, dried and browned and impregnated with cocoanut oil, as specified.

2. The improved process for preparing food from wheat grain consisting in submerging the grain in water and cooking it under fifteen pounds pressure until the starch is hydrolized, adding cold water until the kernels are fully swelled, removing the excess of water by centrifugal action, raising the temperature of the grain to substantially the boiling point, and then submerging in vegetable oil at a temperature of about 400 degrees Fahr. until the moisture is expelled and the grains browned, and removing the excess of vegetable oil by centrifugal action, as specified.

3. The improved process for preparing food from wheat grain consisting in submerging the grain in water and cooking it under fifteen pounds pressure until the starch is hydrolized, adding cold water until the kernels are fully swelled, raising the temperature of the grain to substantially the boiling point, and then submerging in vegetable oil at a temperature of about 400 degrees Fahr. until the moisture is expelled and the grains browned, and removing the excess of vegetable oil by centrifugal action, as specified.

4. The improved process for preparing food from wheat grain consisting in submerging the grain in water and cooking it under fifteen pounds pressure until the starch is hydrolized, adding cold water until the kernels are fully swelled, then submerging in vegetable oil at a temperature of about 400 degrees Fahr. until the moisture is expelled and the grains browned, and removing the excess of said oil by centrifugal action, as specified.

5. The improved process for preparing food from wheat grain consisting in submerging the grain in water and cooking it under fifteen pounds pressure until the starch is hydrolized, adding cold water until the kernels are fully swelled, then submerging in vegetable oil at a temperature of about 400 degrees Fahr. until the moisture is expelled and the grains browned, as specified.

6. The improved process for preparing food from wheat grain consisting in submerging the grain in water and cooking it under pressure until the starch is hydrolized, and saturating with water until the kernels are fully swelled to about three times their bulk, then submerging the saturated kernels in vegetable oil at cooking temperature until the moisture is expelled and the grains browned, as specified.

7. An improved cereal food consisting of grains of wheat expanded to about three times their normal bulk, and the starch thereof hydrolized and dextrinized, dried and browned and impregnated with vegetable oil, as specified.

In witness whereof we have hereunto set our hands.

WALLACE D. SMITH.
BONEITA A. SMITH.